(12) United States Patent
Ito

(10) Patent No.: US 7,219,582 B2
(45) Date of Patent: May 22, 2007

(54) SECURITY NUT AND TOOL ASSOCIATED THEREWITH

(75) Inventor: Katsuo Ito, Sapporo (JP)

(73) Assignee: Koyokizai Co., Ltd. (JP)

( * ) Notice: Subject to any disclaimer, the term of this patent is extended or adjusted under 35 U.S.C. 154(b) by 0 days.

(21) Appl. No.: 11/386,553

(22) Filed: Mar. 22, 2006

(65) Prior Publication Data

US 2006/0162507 A1 Jul. 27, 2006

(30) Foreign Application Priority Data

Sep. 21, 2004 (JP) ................. PCT/JP2004/013746

(51) Int. Cl.
*B25B 13/06* (2006.01)

(52) U.S. Cl. ....................... 81/125; 81/121.1

(58) Field of Classification Search .................. 81/125, 81/121.1, 120, 53.2, 441

See application file for complete search history.

(56) References Cited

U.S. PATENT DOCUMENTS

| | | | | |
|---|---|---|---|---|
| 1,815,500 A | * | 7/1931 | Doan | 81/53.2 |
| 3,094,022 A | * | 6/1963 | Young | 81/53.2 |
| 3,104,569 A | * | 9/1963 | Davis et al. | 81/53.2 |
| 3,457,812 A | * | 7/1969 | Wagner, Jr. | 81/52 |
| 4,671,141 A | * | 6/1987 | Hanson | 81/53.2 |
| 5,065,649 A | * | 11/1991 | Evers et al. | 81/458 |
| 5,123,310 A | * | 6/1992 | McManus | 81/125 |
| 5,832,796 A | * | 11/1998 | Chopra | 81/467 |
| 6,189,416 B1 | * | 2/2001 | Groom | 81/53.2 |
| 6,877,402 B1 | * | 4/2005 | Pigford et al. | 81/53.2 |
| 2004/0182206 A1 | * | 9/2004 | Korpi | 81/121.1 |

* cited by examiner

*Primary Examiner*—D. S. Meislin
(74) *Attorney, Agent, or Firm*—Irving Keschner

(57) ABSTRACT

A tool for tightening and loosening a security nut and the security nut associated with the aforementioned tool that allow easy tightening of the security nut, makes it difficult to remove the security nut when using ordinary tools, and makes it easy to remove the security nut if the dedicated tool is used. The security-nut tightening tool used for screwing and tightening the conical, trapezoidal security nut onto a bolt comprises a hollow section that covers and seats the tapered outer surface of the security nut, a rotation grip section that protrudes above the hollow section, a head female-thread section that is linked to a hollow space along the axis of the rotation grip section and screws onto the bolt, an inner tapered surface that is fixed to the inner wall surface of the tool and has the same slope angle as the tapered outer surface and an elastic friction part.

5 Claims, 9 Drawing Sheets

27° ~ 30°

27° ~ 30°

SECURITY NUT AND TOOL ASSOCIATED THEREWITH

BACKGROUND OF THE INVENTION

1. Field of the Invention

The present invention is related to tools which are used for tightening and loosening uniquely formed nuts, such as tapered nuts, for the purpose of preventing crimes and, in particular, tools for tightening and loosening a conical, trapezoidal shaped security nut, and to the security nut associated with the tools.

2. Description of the Prior Art

The traditional head of the bolt and the nut, which are used for tightening, are typically hexagonal or multiple-sided in shape so that an ordinary person can tighten them using a tool easily available in the open market, such as a spanner or a monkey wrench. Therefore, pranks and crimes have begun to occur more frequently, such as removing the tightening section of a railroad as a prank or stealing an automatic vending machine by removing the fasteners.

To resolve these problems, Japanese Patent Publication #2000-205225 (to Tokkai), for example, discloses bolts and nuts that cannot easily be loosened or removed by an ordinary person. The head of the bolt and the nut are shaped as a multi-sided or non-arcing outer rim, while the surface of the outer rim is sloped and flared from the top toward the bottom. If these bolts and nuts are tightened using the special tightening tool that has a sloped wall in order to make contact with the sloped surface of the bolt or the nut, then these bolts and nuts cannot be removed using an ordinary tool available in the open market because ordinary tools cannot grip the sloped outer rim, and therefore crime can be prevented from occurring.

In the invention described in the aforementioned publication, the rotational torque for tightening is transmitted only by engaging the sloped wall of the dedicated tightening tool with the sloped surface of the bolt and nut. Therefore, in order for the bolt and nut to engage the dedicated tightening tool, the outer rims of the bolt and nut must be shaped as multi-sided or non-arcing. However, it is preferable to make the shape a conical trapezoid because this shape is most difficult to rotate and thus the most effective in terms of crime prevention. However, with the conical trapezoid shape there is a problem in which the aforementioned dedicated tightening tool cannot be engaged, meaning that the bolt and nut cannot be rotated. Moreover, a complex manufacturing process is required for production of the multi-sided shape, which is impractical due to the high costs of labor and production.

Even though security has to be improved, sometimes the nuts and bolts must be removed, such as when there is a need to relocate an automatic vending machine. When removing the nuts, much greater torque is required for loosening than tightening. However, the process of removal has never been considered in the design of the nuts or in regard to the dedicated tightening tool described in the aforementioned publication. Thus there is a problem in which the removal of nuts is quite difficult due to poor torque transmittal.

Furthermore, to improve security it must be difficult to remove the nuts using other common tools such as pliers, in addition to a spanner or a monkey wrench, both of which are commonly used to tighten and loosen ordinary nuts.

What is thus desired is to provide a dedicated tool for tightening the security nut, a tool for loosening the security nut, a tool for tightening/loosening the security nut, and the security nut associated with these tools that will allow easy tightening of the security nut, make it difficult to remove the security nut when using ordinary tools, and making it easy to remove the security nut if the dedicated tool is used.

SUMMARY OF INVENTION

The present invention provides a tool for tightening a security nut by screwing the conical, trapezoidal security nut onto a bolt and then tightening the nut. The tool has a hollow section that can cover and seat the tapered outer surface of the security nut, a rotation grip section that protrudes above the hollow section, a head female-threaded section that is located along the axis of the rotation grip section and linked to the hollow section, such female-threaded section of which screws onto the bolt protruding from the head of the security nut. The tool has an elastic friction part that is affixed to the inner wall surface of the hollow section and has an inner tapered surface with the same taper angle as the tapered outer surface of the security nut.

The tightening tool of the present invention functions as follows: If the hollow section is overlaid atop the tapered outer surface of the security nut, and if the head female-threaded section screws onto the bolt by rotating the rotation grip section using a wrench, then the tightening tool will move toward the tightening direction guided by the male-threaded section of the bolt via the head female-threaded section. This tightening action will press the elastic friction part downward, onto the tapered outer surface of the security nut, and friction power will occur elastically between those two surfaces. The friction power will transmit the rotational power to the security nut and tighten it. During this operation the friction power is generated between the aforementioned two tapered surfaces by the elastic friction part having good elasticity, so that no digging will occur between the two respective surfaces. Therefore, when the tool for tightening is rotated in the direction of removal, the security nut will not rotate along with it.

The tool for loosening the conical, trapezoidal shaped security nut comprises a hollow section that can cover and seat the tapered outer surface of the security nut, and the hollow section has an inner wall surface with the same taper angle as said outer tapered surface. The tool has a rotation grip section that protrudes above the hollow section and a head female-threaded section that is located along the axis of the rotation grip section and linked to the hollow section, such female-threaded section of which screws onto the bolt protruding from the head of the aforementioned security nut. The tool has, on the side of the hollow section, a side female thread through-hole drilled from the outer surface to the aforementioned hollow section, and is equipped with a coupling screw that will be screwed in and couple with the tapered outer surface of the security nut.

The tool for loosening the security nut functions as follows: When removing the security nut, the head female-threaded section screws onto the male-threaded section of the bolt where the security nut screws on, and is left as affixed. The coupling screw is inserted to the side female-thread hole and digs into the tapered outer surface of the aforementioned security nut. This unifies the security nut with the rotational movement of the hollow section. Under this condition, if the rotation grip section is rotated in the direction of removal, the rotation power is transmitted to the security nut and the security nut is loosened.

The tool for tightening/loosening the security nut tightens the conical, trapezoidal shaped security nut by screwing it onto the bolt, or is used to loosen the security nut. The tool for tightening/loosening the security nut comprises a hollow section that can cover and seat the tapered outer surface of the security nut and a rotation grip section that protrudes above the hollow section. The tool has a head female-threaded section that is located along the axis of the rotation grip section and linked to the hollow section, such female-threaded section of which screws onto the bolt protruding from the head of the aforementioned security nut. The tool has an elastic friction part that is affixed to the inner wall surface of the aforementioned hollow section and has an inner tapered surface with the same taper angle as the tapered outer surface of the security nut. The tool has, on the side of the hollow section, a side female-threaded hole that is drilled from the outer surface to the hollow section, a screw hole extending through the elastic friction part aligned with the side female-threaded hole and couples with the tapered outer surface of the security nut.

The tool for tightening/loosening the security nut functions as follows: When tightening, the head female-threaded section screws onto the male-threaded section of the bolt, and the tapered surfaces make contact with each other. If the rotation grip section is further rotated to give rotational power to the hollow section in the direction of tightening, the screwing action of the head female-threaded section on the bolt's male-threaded section will cause the elastic friction part to apply elastic pressure on the tapered outer surface of the security nut, thereby causing friction power to occur between the two surfaces. The frictional power transmits the rotational power to the security nut, and the security nut is tightened. When removing the security nut, the head female-threaded section screws onto the male-threaded section of the bolt and is left affixed. The coupling screw is then inserted to the side female-threaded hole and holds onto the tapered outer surface of the security nut. This unifies the security nut with the hollow section. Under this condition, if the rotation grip section is rotated in the direction of removal, the hollow section is also moved in the same direction. The coupling screw, which grips the tapered outer surface of the security nut, transmits the rotation power to the security nut and the security nut is loosened.

The security nut of the present invention has a tapered outer surface so that said nut can be tightened or loosened by the applicable tool described hereinabove; the taper angle of the tapered outer surface is in the range between approximately 27° to approximately 30° with respect to the axial direction of the security nut.

The tapered outer surface, with an angle greater than 27°, cannot be rotated using ordinary pliers, which makes it very difficult to remove the security nut. Moreover, the tapered outer surface with the angle less than 30° can capture sufficient perpendicular components, with respect to the axis, of the friction force received from the elastic friction part and of the coupling power received from the coupling screw, to rotate the tapered outer surface. Additionally, the sufficient strength of the security nut needed to avoid damage can easily be obtained by providing the adequate height in the axial direction without making its outer radius inconveniently large.

The security nut of the present invention further utilizes a tightening head section configured above the tapered nut section of the conical trapezoid via the cut-off section. The tapered nut section has the tapered outer surface that is used by two versions of the tool described hereinabove when removing. The taper angle of the tapered outer surface is configured in the range of 27° to 30° with respect to the axial direction of the security nut.

The security nut with the tightening head section can be tightened easily using a tool that is readily available in the open market. When this security nut is tightened very hard, the tightening head section will break off from the cut-off section, leaving the tapered nut section securely in position.

The present invention thus provides a security nut and the associated dedicated tools that allow easy tightening of the security nut, makes it virtually impossible to easily remove the security nut when using an ordinary tool readily available in the open market, and makes it relatively easy to loosen and remove the security nut as needed using the dedicated tool of the present invention yet maintain high safety and security.

DESCRIPTION OF THE DRAWINGS

For a better understanding of the present invention as well as other objects and further features thereof, reference is made to the following description which is to be read in conjunction with the accompanying drawing wherein.

DESCRIPTION OF THE INVENTION

Figure 1:
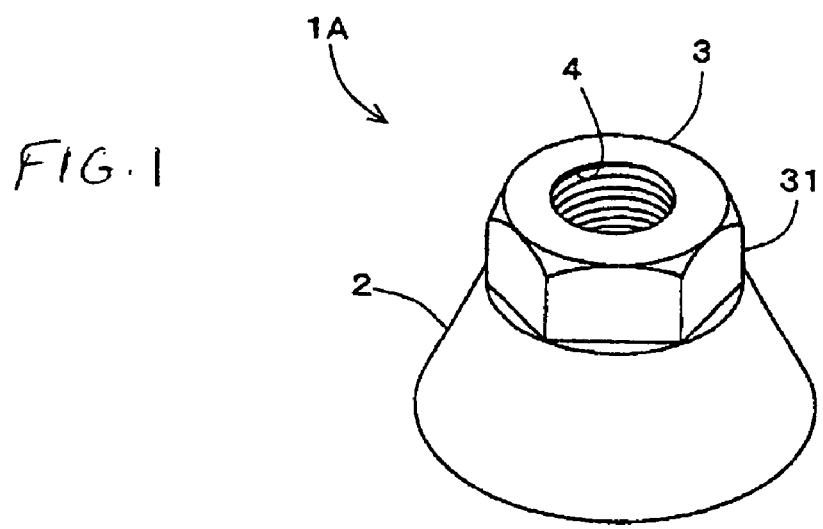
FIG. 1 is a perspective view showing a first embodiment of the tightening tool of the present invention.
Figure 2:
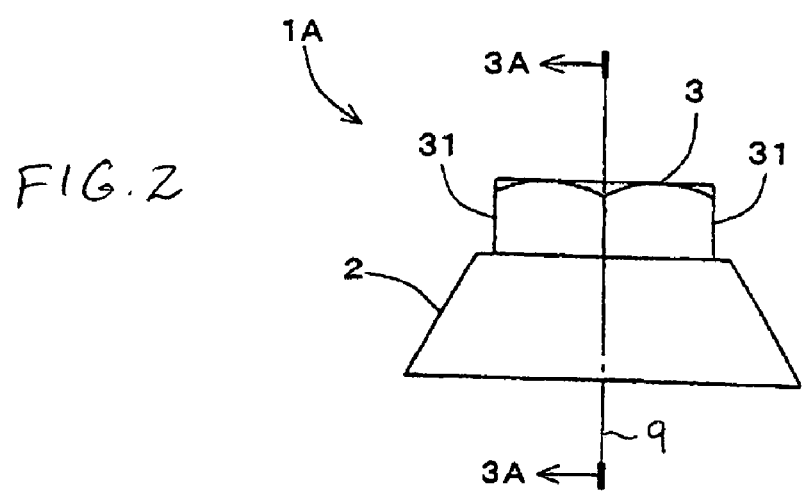
FIG. 2 is a front view of the tightening tool shown in FIG. 1.
Figure 3:
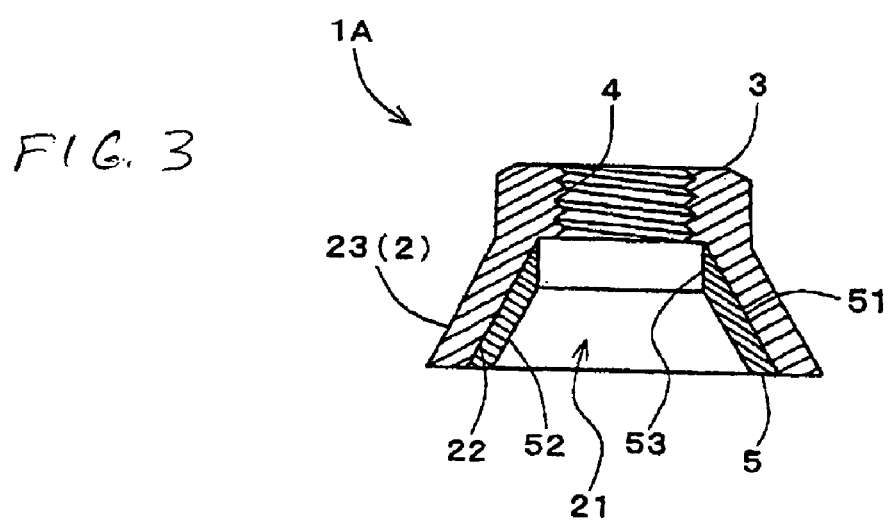
FIG. 3 is a cross-sectional view along line 3A—3A of FIG. 2.

FIG. 1 is a perspective view of the tightening tool 1A, FIG. 2 is a frontal view diagram of the tightening tool 1A and FIG. 3 is a cross-sectional view along the line 3A—3A of FIG. 2. The description hereinafter illustrates how the security nut N shown in FIG. 4 is tightened and loosened (the security nut N is also called the conical, trapezoid-shaped taper nut) and shows the tapered bolt B, which has the head section shaped as a conical trapezoid.

As shown in FIGS. 1 through 3, the tightening tool 1A is configured with a hollow section 2 that has an inner space 21 to seat the security nut N, a rotation grip section 3 that rotates the hollow section 2, a head female-threaded section 4 that is linked through to the hollow space 21 along the axis of the rotation grip section 3, and an elastic friction part attached to the inner wall surface 22 of the hollow section 2.

Each component of tool 1A is described below. The inner wall surface 22 and the outer wall surface 23 of the hollow section 2 are tapered. The hollow space 21 is configured at the inside of the inner wall surface 22 and covers and seats almost all of the outer tapered surface n of the security nut N. The rotation grip section 3 is configured in such a way that it protrudes above the hollow section 2 and is shaped the same as an ordinary nut so that its side surface 31 can be gripped by a spanner or a monkey wrench that is readily available on the open market. The rotation grip section 3 is preferably hexagonally shaped considering the need for commonality and operability, but the side surface 31 can be of any shape such as a square, other multiple-sided or arcing shaped, as long as it can be gripped with any tool that is readily available on the open market.

Figure 4:
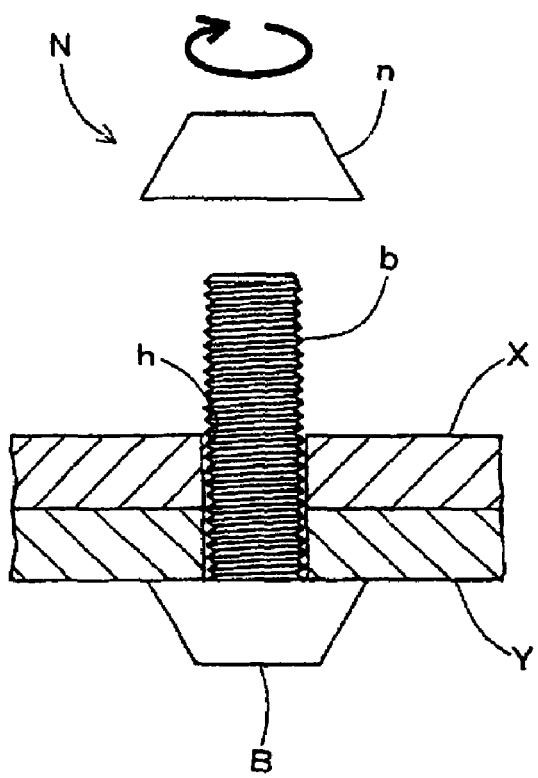
FIGS. 4–7 illustrate how the tightening tool of FIG. 1 is utilized.

The head female-threaded section 4 is configured, in the direction along the center axis of the rotation grip section 3, so that it links with the hollow space 21 of the hollow section 2 and screws onto the male-threaded section b of the tapered bolt B shown in FIG. 4 and allows the tightening tool 1A to rotate around the male-threaded section b and move along the axial direction. It is not important whether or not the head female-threaded section 4 is threaded completely through the rotation grip section 3.

The purpose of the elastic characteristic of the elastic friction part 5 is to prevent the tightening tool 1A from digging into the tapered outer surface n and to allow the tightening tool 1A to easily separate from the tapered outer surface n. The elastic friction part 5 comprises a rubber-like material that provides high friction force when pressed against the tapered outer surface n of security nut N. The aforementioned elastic friction part 5 has an outer peripheral surface 51 that has the same slope angle as the inner wall surface 22 of the hollow section 2, and its entirety is firmly attached to the inner surface 22 using an adhesive. The elastic friction part 5 has an inner tapered surface 52 that has the same taper angle as the tapered outer surface n and is designed to make complete contact all the way around with the tapered outer surface n. Additionally, the elastic friction part 5 provides the shaped circular hole 53 at a position corresponding to the head female-threaded section 4, which makes it easier to guide in the male-threaded section b of the tapered bolt B. The outer peripheral surface 51 of the elastic friction part 5 and the inner wall surface 22 of the hollow section 2 are configured so that they have nearly the same taper angle as the tapered outer surface n, so that uniform pressure can be applied over the whole outer tapered surface n. However, it is not necessarily limited to this configuration or shape. It can be of any shape or form, as long as the overall elastic friction part 5 is firmly attached to the hollow section 2 and the inner tapered surface 52 has a taper angle appropriate for making the desired contact with the tapered outer surface n. Moreover, the elastic friction part 5 contacts the entire tapered outer surface n of the security nut N in order to generate the maximum friction force between the hollow section 2 and the elastic friction part 5. However, it is not necessarily limited to this configuration, it only being required that the necessary rotational torque can be transmitted.

The operation of the tightening tool 1A is described with reference to FIGS. 4 through 7. The following description is an example of the operation for tightening the security nut N onto the tapered bolt B.

Figure 5:
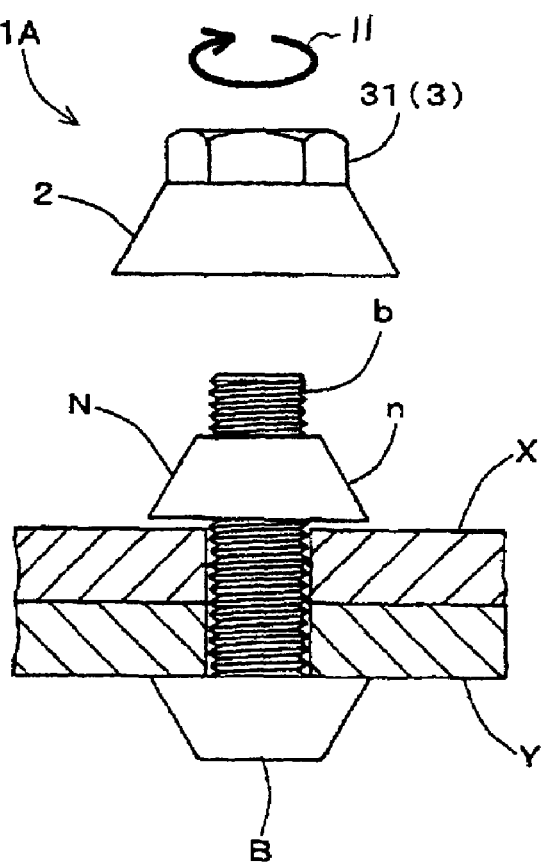
Figure 6:
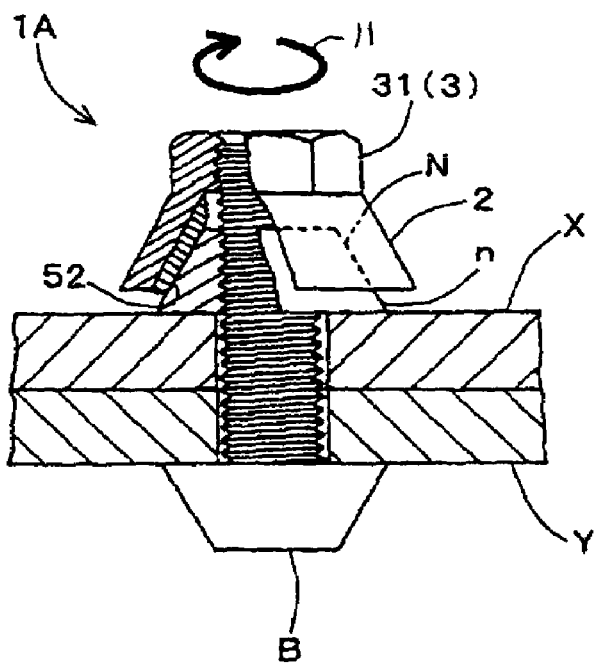

When fastening the attaching part X onto the attached-to part Y by tightening the security nut N onto the male-threaded section b of the tapered bolt B using the tightening tool 1A, the tapered bolt b is inserted first, as shown in FIG. 4, through the accepting hole h that runs through both the attaching part X and attached-to part Y. Next, as shown in FIG. 5, the security nut N is lightly screwed onto the male-threaded section b of the tapered bolt B, and then the head female-threaded section 4 of the tightening tool 1A screws onto the male-threaded section b of the tapered bolt B and rotates in the direction of tightening as illustrated by arrow 11. Tightening tool 1A is continually rotated in the direction of tightening until the inner tapered surface 52 of the elastic friction part 5 makes contact with the tapered outer surface of the security nut N, as shown in FIG. 6. At this point, the inner tapered surface 52 makes contact almost all the way around with the tapered outer surface n and greater friction force is generated.

Once the tightening tool 1A makes contact with the security nut N, the side surface 31 of the rotation grip section 3 is gripped with a spanner or something that is readily available on the open market, and rotation torque is applied toward the direction of tightening 11. The rotation grip section 3 rotates the hollow section 2, and simultaneously the head female-threaded section 4 rotates around the male-threaded section b and moves the hollow section 2 toward the security nut N. This causes the elastic friction part 5 to rotate as it is pressed firmly against the security nut N, and a large amount of friction force is generated between the elastic friction part 5 and the security nut N. As a result, this friction force rotates the security nut N toward the direction of tightening 11 and the security nut N is tightened firmly.

Figure 7:
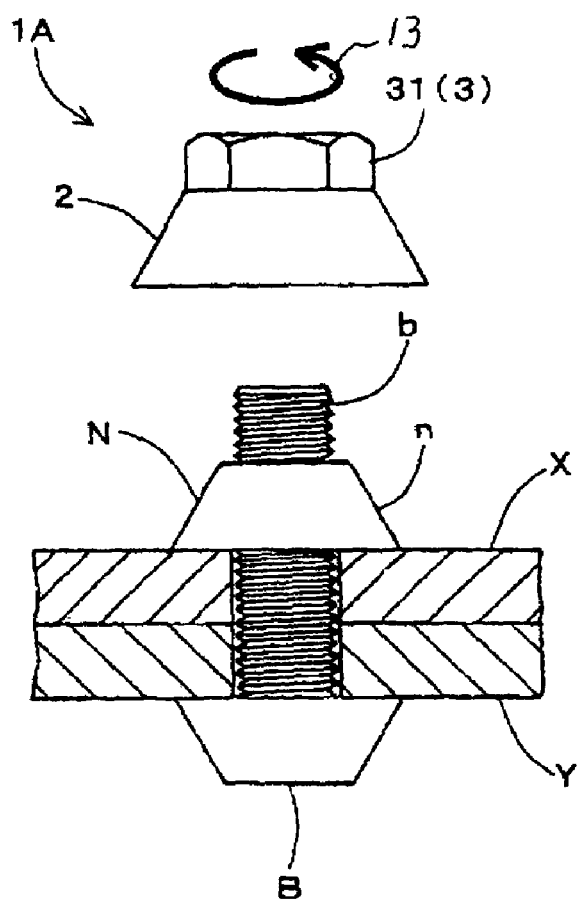

Once the tightening operation is complete, rotational torque is applied to the rotation grip section 3 toward the direction of loosening 13 as shown in FIG. 7. At this point the tightening tool 1A moves toward the direction of separating from the security nut N, and the security nut N will not rotate together because the elastic friction part 5 serves to absorb shock. Thus the friction force is no longer generated between the elastic friction part 5 and the security nut N, and only the tightening tool 1A is removed. On the other hand, if a non-elastic part is installed on the surface contacting the tapered outer surface n of the security nut N, then both surfaces will dig into each other during the tightening operation. Therefore, if rotated toward the direction of loosening 13 both would be rotated together and the security nut N would come off. Incorporating the elasticity means that when the tightening tool 1A is removed the elastic force is applied to the security nut N in the direction of tightening 11, and the push is applied to the removing operation of the tool 1A, contributing to a removal operation that is precise and easy. Therefore it is essential that the elastic friction part be configured with a material that provides good elasticity.

Given the above operation, the security nut N is tightened firmly onto the tapered bolt B attaching the attaching part X to the attached-to part Y as shown in FIG. 7. In this condition the security nut N cannot be loosened using ordinary tools such as spanners or pliers, and therefore it will be quite difficult for an ordinary person to loosen the nut.

Strong friction force is generated by having the elastic friction part 5 closely contact the tapered outer surface n of the security nut N, and the rotational torque is transmitted by this friction force. Therefore, the security nut N with high crime-prevention characteristics can be tightened firmly onto the male-threaded section b.

Figure 8:
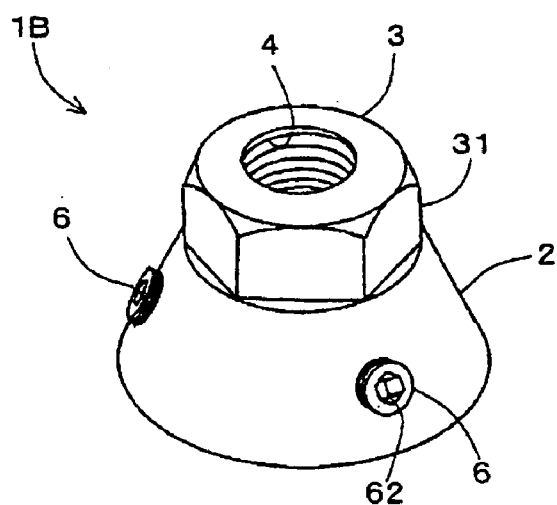
FIG. 8 is a perspective view of a first embodiment of the loosening tool of the present invention.
Figure 9:
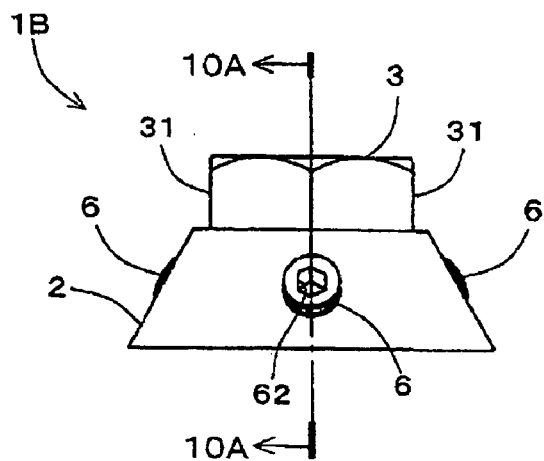
FIG. 9 is a front view of the loosening tool shown in FIG. 8.
Figure 10:
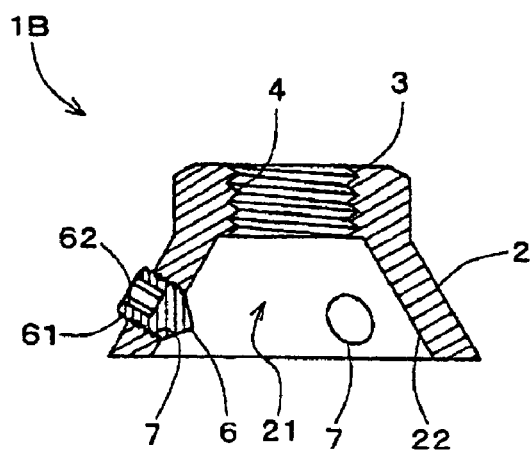
FIG. 10 is a cross-sectional view along line 10A—10A of FIG. 9.

FIG. 8 is a perspective view of a second embodiment of a loosening tool 1B for the security nut N. FIG. 9 is a frontal diagram of the tightening tool 1B, and FIG. 10 is a cross-sectional view along the line 10A—10A of FIG. 9. Note that the same numeral identifiers are used for the same or similar components shown in FIGS. 1 and 8 and thus the description thereof will be omitted.

As shown in FIGS. 8 through 10, a feature of loosening tool 1B uses coupling screw 6 and the side female-threaded hole 7, since the tool is mainly used to loosen the security nut N from the tightened state. A setscrew with a hexagonal head and pointed tip is used as the coupling screw 6. The tip of the setscrew 6 is shaped with a sharp angle, and has a male-threaded section 61 to screw into the side female-threaded hole 7. The rear end of setscrew 6 has a hexagonal hole 62 for tightening and can be rotated with a hexagonal set-wrench. On the other hand, the side female-threaded hole 7 is configured as a through-hole between the outer wall surface 23 and the inner wall surface 22 of the hollow section 2, and allows the coupling screw 6 to protrude from the inner wall surface 22 of the hollow section 2.

Since an elastic friction part 5 is not installed in the loosening tool 1B, the inner wall surface 22 of the hollow section 2 is configured to have the same taper angle as the tapered outer surface n of the security nut N. This allows the inner wall surface 22 to make nearly complete contact with the tapered outer surface n. Three side female-threaded holes 7 are preferably provided as spaced 120° apart along the periphery of the wall surface 22 in order to engage the security nut N with more certainty.

Figure 11:
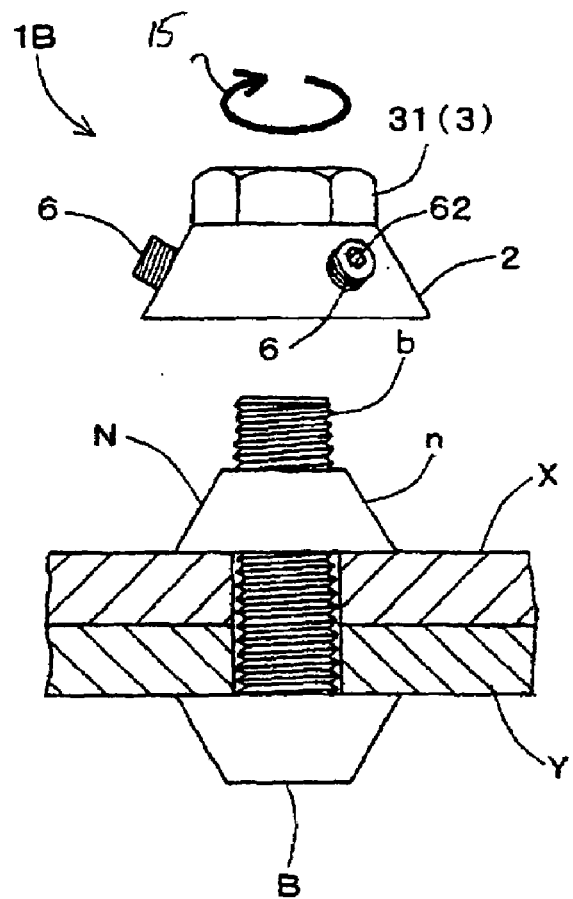
FIGS. 11 and 12 show how the tool of FIG. 8 can be utilized to tighten the security nut of the present invention.

The operation of the loosening tool 1B is described with reference to FIGS. 11 through 14. In the following, an example of the operation to remove the conical, trapezoidal security nut N from the tapered bolt B with the conical, trapezoidal head, where said nut and bolt are in the state of bounding the attaching part X and the attached-to part Y together is set forth. When removing the security nut N from the tapered bolt B using loosening tool 1B first, as shown in FIG. 11, the head female-threaded section of the loosening tool 1B screws onto the male-threaded section b of the tapered bolt B and is rotated in the direction of arrow 15. At this point the coupling screws 6 are lightly screwed into the side female-threaded holes, and the tip of the coupling screw 6 does not protrude from the inner wall surface 22.

Figure 12:
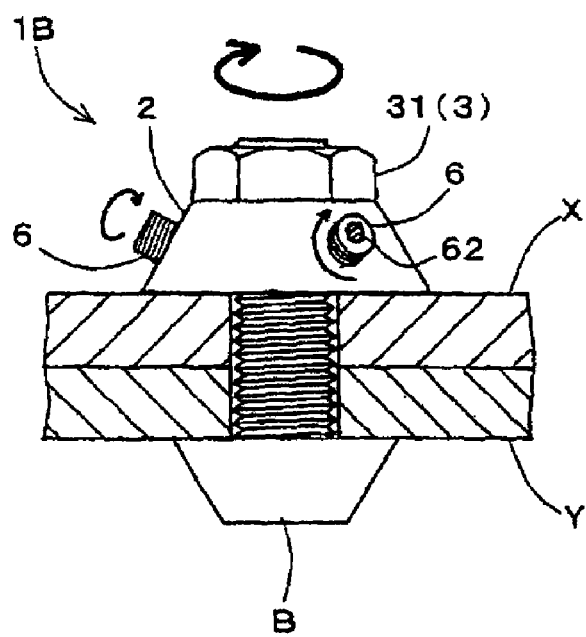

Next, the loosening tool 1B is rotated until the inner wall surface 22 of the hollow section 2 touches the tapered outer surface n of the security nut N. Then, as shown in FIG. 12, a hexagonal set-wrench, which is not shown in the figure, is inserted to the hexagonal hole 62 of the coupling screw 6, and the coupling screw is further screwed into the side female-threaded hole. At this point, the loosening tool 1B would not move along the axis of the tapered bolt B, since the head female-threaded section 4 screws onto the male-threaded section b. Therefore, when the coupling screws 6 screws further into the side female-threaded hole 7, the loosening tool 1B would not float up from the security nut N, and the tip of the coupling screws 6 will protrude from the inner wall surface 22, digging in and coupling with the tapered outer surface n of the security nut N. It should be noted that the axis of the side female-threaded hole 7 is configured in such a way that it is perpendicular to the inner wall surface 22. Therefore, the coupling screw 6 protrude perpendicular to the tapered outer surface n and are securely coupled to the tapered outer surface n.

Figure 13:
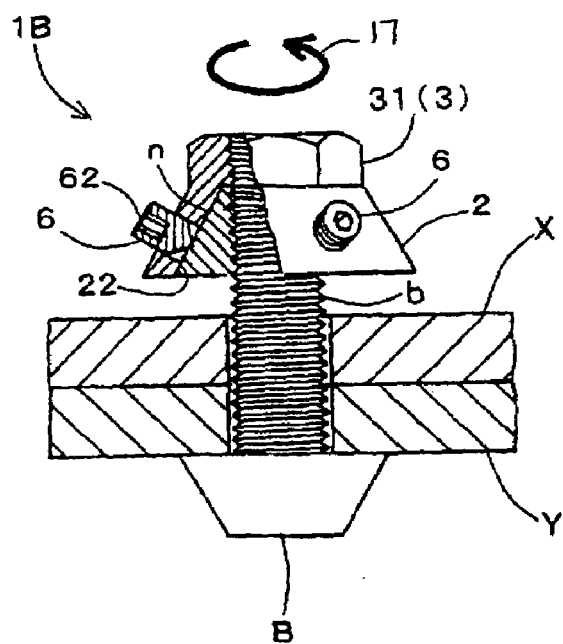
FIGS. 13 and 14 illustrate how the tool of FIG. 8 is used to loosen the security nut of the present invention.
Figure 14:
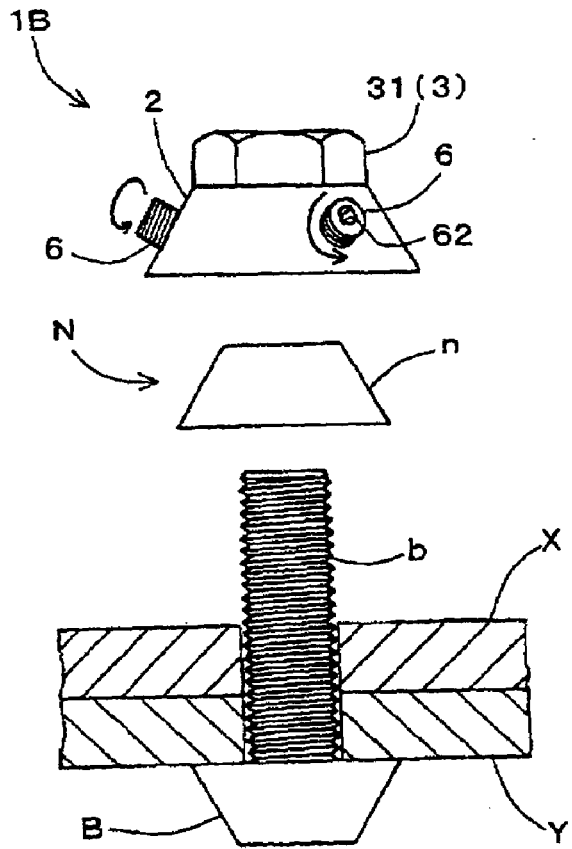

Next, the side surface 31 of the rotation grip section 3 is gripped by an ordinary tool such as a spanner, and is rotated toward the direction of loosening 17 as shown in FIG. 13. The security nut N that is coupled by the coupling screws 6 also rotates together with the loosening tool 1B. Without sliding on the tapered outer surface n of the security nut N, the coupling screw 6 rotates the security nut N toward the direction of loosening 17. In this way the firmly tightened security nut N can be loosened easily. After removal, as shown in FIG. 14, the security nut N can be separated from the loosening tool 1B by retracting the coupling screw 6 back into the side female-threaded hole 7 and removing the coupling screw 6 from the tapered outer surface n.

Tool 1B applies strong gripping power to security nut N, which an ordinary tool cannot remove due to slippage, by means of the coupling screws 6 digging into the tapered outer surface n, and the rotational torque is transmitted through this gripping power. Because of this, even the firmly tightened security nut N can easily be removed.

Figure 15:
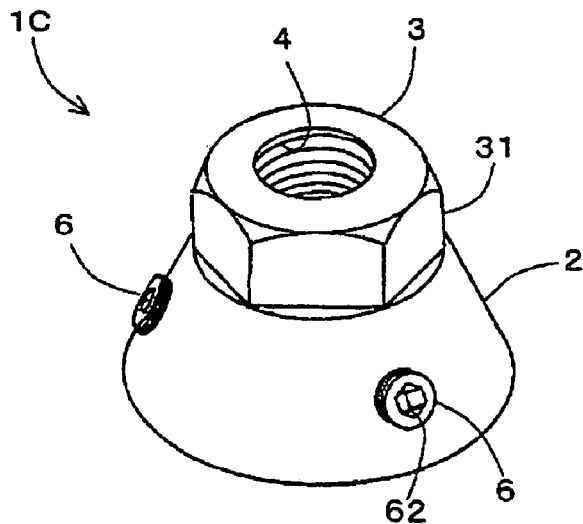
FIG. 15 is a perspective view of the tightening/loosening tool of the present invention.
Figure 16:
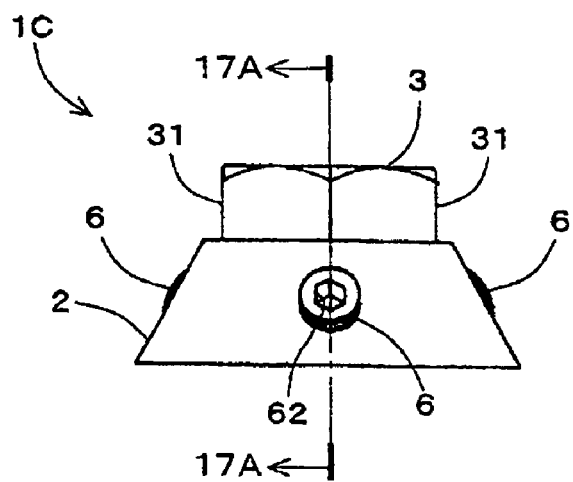
FIG. 16 us a front view of the tightening/loosening tool shown in FIG. 15.
Figure 17:
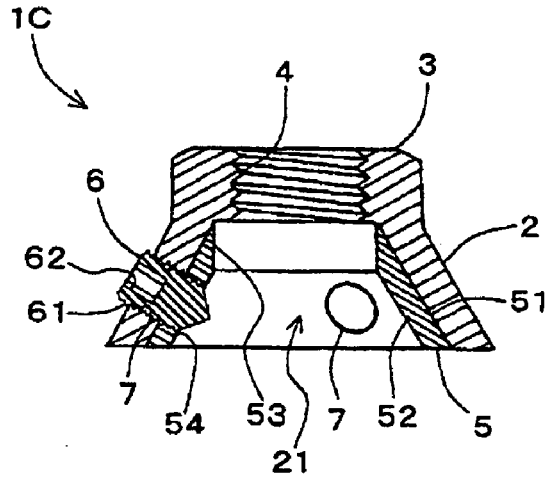
FIG. 17 is a cross-sectional view along the line 17A—17A of FIG. 16.

FIG. 15 is a perspective view of tightening/loosening tool 1C, another tool in accordance with the present invention, FIG. 16 is a frontal diagram of the tightening/loosening tool 1C, and FIG. 17 is a sectional view along the line 17A—17A of FIG. 16. Furthermore, the same numeral identifiers are used for the components shown in the FIGS. 1, 8 and 15 embodiments and thus the descriptions thereof will be omitted.

As shown in FIGS. 15 through 17, tightening/loosening tool 1C the elastic friction part 5, coupling screw 6 and the side female-threaded hole 7 in order to be used for both tightening and loosening the security nut N. In the elastic friction part 5 the screw insertion hole 54 is configured at a location equivalent to the extended side female-threaded hole 7, so that the coupling screw 6 can be inserted through it and the tip can protrude from the inner tapered surface 52.

When tightening the security nut N using tightening/loosening tool 1C, the coupling screws 6 are put in the position such that their tip does not protrude from the inner tapered surface 52 of the elastic friction part 5. By doing so, the tightening/loosening tool 1C can be used in a manner similar to the tightening tool 1A, the rotational torque being transmitted by the friction force generated between the elastic friction part 5 and the security nut N, and the security nut N can be tightened firmly. On the other hand, when loosening the security nut N, the tip of the coupling screw 6 protrudes from the inner tapered surface 52 of the elastic friction part 5. By doing so the tightening/loosening tool 1C can be used in a manner similar to loosening tool 1B, the rotational torque being transmitted through the gripping power generated by the coupling screws 6 to the security nut N, and the firmly tightened security nut N can be loosened and removed.

Tool 1C can perform the operations for both tightening and loosening the security nut N.

The aforementioned tools 1A, 1B and 1C can be used for various security nuts as long as the tapered outer surface n matches the slope. However, among the so-called security nuts N there are products that cannot perform the security function adequately, or products that are difficult to tighten or remove even if special tools are used. There are products with very high taper angles. However, these types can easily be removed using ordinary pliers, so it does not offer adequate security. On the other hand, the product, in which the tapered outer surface n is nearly horizontal, has very weak strength because of its low height, and it has poor operability because the operating force for tightening or removal cannot be transmitted easily.

Figure 18:
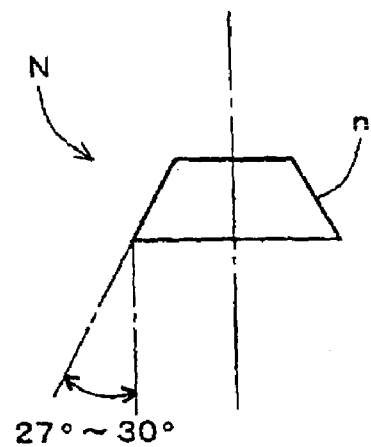
FIG. 18 is a front view of the security nut of the present invention.

It has been discovered the ideal range for the taper angle of the tapered outer surface is between 28° and 29° with respect to the axis of the security nut N, as shown in FIG. 18. If the range of the taper angle is set within 27° and 30° (including the manufacturing tolerances), the desired result can be obtained. In the preferred embodiment, the taper angle is set at 29° for the security nut N sizes M8 or M10 of JIS (Japan Industrial Standard), and is set at 28° for the security nut N size M12 of JIS.

When the taper angle of the tapered outer surface n is configured in the manner described above so that it is greater than 27°, and if an ordinary tool readily available on the open market (such as pliers having parallel squeezing surfaces) is used on the security nut N, the surface area for contact becomes extremely small and friction force sufficient for rotation cannot be generated. Therefore, it will be extremely difficult to remove the security nut N with an ordinary tool readily available on the open market.

On the other hand, when the tapered outer surface n is configured with an angle of less than 30°, the sufficient perpendicular component, with respect to the axis of the security nut N, of the friction force is obtained from the elastic friction part 5 during tightening, or the sufficient perpendicular component of the coupling force from the coupling screws 6 is obtained during removal. Thus the tapered outer surface n can be rotated. Also, the strength needed to prevent damage can easily be obtained by providing sufficient axial height without making the radius of the security nut N inconveniently large.

Additionally, the taper angle of the inner tapered surface 52 of the tightening tool 1A or the tightening/loosening tool 1C, as well as the taper angle of the inner wall surface 22 of the loosening tool 1B, is configured to have a range within 27° and 30° to match the taper angle of the aforementioned outer tapered surface n.

Figure 19:
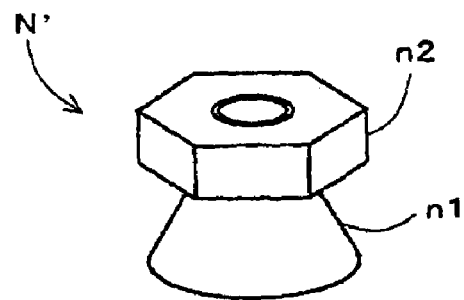
FIG. 19 is a perspective view showing the embodiment of the security nut with the tightening head section.
Figure 20:
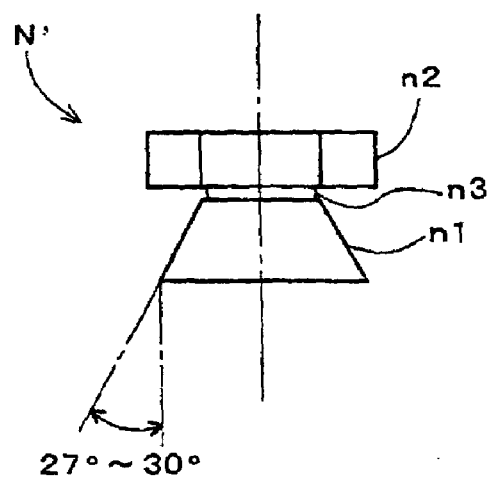
FIG. 20 is a front view showing the security nut with the tightening head section in accordance to the teaching of the present invention.

In the aforementioned embodiments, descriptions are given based on using the simple, conical, trapezoidal security nut N. However, as shown in FIGS. 19 and 20, the security nut N with the tightening head section n2, can be used instead. The security nut N' with the tightening head section is comprised of a tapered nut section n1 that is identical to the security nut N, a tightening head section n2 having the same configuration as an ordinary nut, and a cut-off section n3 that is positioned between the tightening head section n2 and the tapered nut section n1. The cut-off section n3 is designed to break off when a given rotational force is applied, and will thus separate the tightening head section n2 from the tapered nut section n1.

Figure 21:
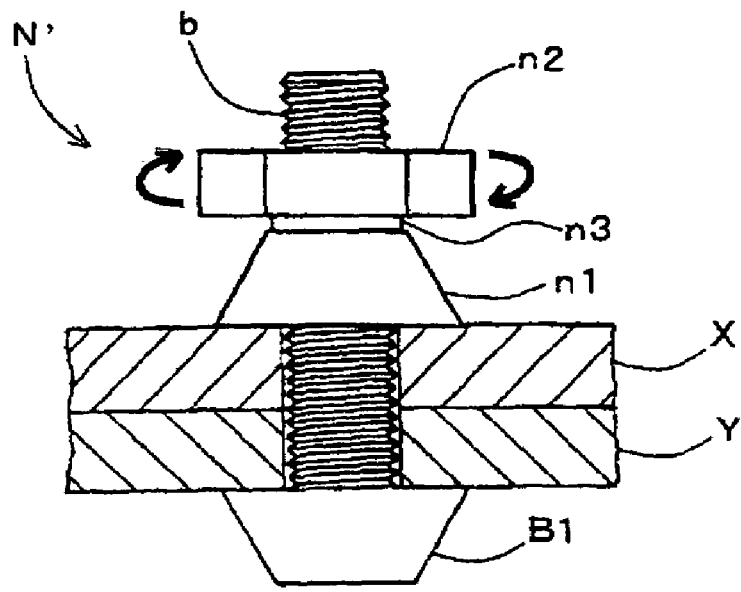
FIGS. 21 and 22 illustrate the use of the security nut with the tightening head section of the present invention.
Figure 22:
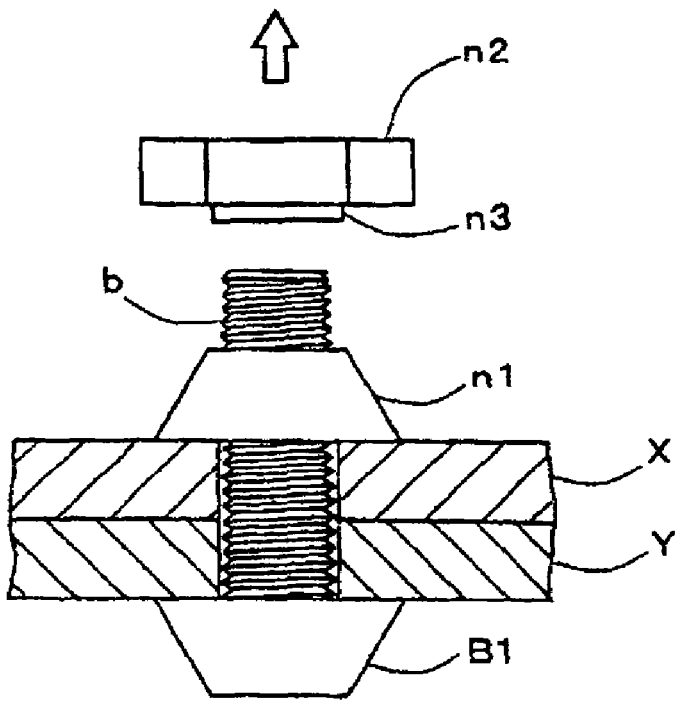

When tightening the security nut N' with the tightening head, the tightening head section n2 can be tightened easily as shown in FIG. 21, using an ordinary tool readily available on the open market such as a spanner. Furthermore, as shown in FIG. 22, the tightening head section n2 can break away from the cut-off section n3 when it is tightened further. Because of this, only the tapered nut section n1 is left behind firmly tightened. When removing the security nut N' with the tightening section n2, the loosening tool 1B or the tightening/loosening tool 1C of this invention can be used to remove it easily. The tapered outer surface n of the tapered nut section n1 of the security nut N' with the tightening head section should have a taper angle in the range of 27° to 30°, as shown in FIG. 20.

The embodiments of the tightening tool 1A, the loosening tool 1B and the tightening/loosening tool 1C for the security nuts described hereinabove are not limited to the embodiments described above.

For example, for the tools 1B and 1C, each of the coupling screws 6 and the side threaded holes 7 are positioned separately in the peripheral direction. However, the number of these components can be greater or less. In addition, all the tools can be used to tighten or loosen the tapered bolt B if the bolt head is configured as a conical trapezoid.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed:

1. A tool for screwing and tightening a conical, trapezoidal shaped security nut onto a bolt, comprising a hollow section having a hollow space that covers and seats the tapered outer surface of said security nut, a rotation grip section that protrudes above the hollow section, a head female-threaded section that is linked to the hollow space of said hollow section along the axis of the rotation grip section and screws onto the bolt protruding from the head of said security nut, an inner tapered surface that is fixed to the inner wall surface of said hollow section and has substantially the same taper angle as the tapered outer surface of said security nut and an elastic friction part.

2. A tool for loosening and removing a conical-trapezoidal security nut from a bolt, comprising a hollow space that covers and seats the tapered outer surface of said security nut, an inner wall surface of the hollow section that has substantially the same taper angle as the tapered outer surface, a rotation grip section that protrudes above the hollow section, and a head female-threaded section that is linked to the hollow space of the aforementioned hollow section along the axis of the rotation grip section and screws onto the bolt protruding from the head of said security nut, a side female-threaded hole located on the said hollow section that is drilled through from the outer surface to the inner hollow space, and at least one coupling screw that screws into the side female-threaded hole and couples onto the tapered outer surface of said security nut.

3. A tool for tightening or loosening a conical, trapezoidal security nut onto or from a bolt comprising a hollow section with a hollow space that covers and seats the tapered outer surface of said security nut, a rotation grip section that protrudes above the hollow section, a head female-threaded section that is linked to the hollow space of said hollow section along the axis of the rotation grip section and screws onto the bolt protruding from the head of said security nut, an inner tapered surface that is affixed to the inner wall surface of the aforementioned hollow section and has substantially the same taper angle as the tapered outer surface of said security nut, an elastic friction part, a side female-threaded hole located on said hollow section that is drilled through from the outer surface of the inner hollow space, a screw insertion hole on said friction part linking to the side female-threaded hole, and at least one coupling screw that screws into the side female-threaded hole and through the screw insertion hole and couples onto the tapered outer surface of said security nut.

4. This tool of claims 1 through 3 wherein said tapered outer surface has a taper angle in the range between 27° to 30° with respect to the axis of said security nut.

5. The tool of claims 2 and 3 wherein said security nut has a tightening head section separated from the conical, trapezoidal taper nut section by a cut-off section, said taper nut section having a tapered outer surface with a taper angle in the range between 27° to 30° with respect to the axis of said security nut, whereby said taper nut section can be loosened and removed.

* * * * *